United States Patent
Poe, Jr. et al.

(10) Patent No.: US 6,981,331 B1
(45) Date of Patent: Jan. 3, 2006

(54) FORK LEVEL INDICATOR WITH MAGNETIC DAMPENING MEANS

(76) Inventors: John W. Poe, Jr., 230 Westridge Dr., Raleigh, NC (US) 27609; William L. Dungan, 606 Sloan Dr., Cary, NC (US) 27511; Paul B. Forrest, 511 Dundalk Way, Cary, NC (US) 27512

( * ) Notice: Subject to any disclaimer, the term of this patent is extended or adjusted under 35 U.S.C. 154(b) by 0 days.

(21) Appl. No.: 10/902,965

(22) Filed: Jul. 30, 2004

(51) Int. Cl.
*G01C 9/12* (2006.01)
(52) U.S. Cl. .................. 33/397; 33/345; 33/DIG. 1
(58) Field of Classification Search .......... 33/333, 33/344, 345, 391, 397, 402, DIG. 1
See application file for complete search history.

(56) References Cited

U.S. PATENT DOCUMENTS

| | | | |
|---|---|---|---|
| 369,750 A * | 9/1887 | Spranger | 33/344 |
| 546,501 A * | 9/1895 | Zanger | 33/345 |
| 2,033,127 A * | 3/1936 | Dunlea | 33/354 |
| 2,045,631 A * | 6/1936 | Cavender | 33/391 |
| 2,571,488 A * | 10/1951 | Rooney | 33/DIG. 1 |
| 2,572,766 A * | 10/1951 | Rylsky | 33/345 |
| 3,800,425 A | 4/1974 | Haynie | |
| 3,803,721 A * | 4/1974 | Matsui | 33/391 |
| 3,852,890 A | 12/1974 | Locklair et al. | |
| 3,883,021 A * | 5/1975 | Wilhelm | 33/391 |
| 4,090,306 A * | 5/1978 | Darden | 33/391 |
| 4,091,664 A * | 5/1978 | Zerver | 33/391 |
| 4,102,055 A * | 7/1978 | Volk, Jr. | 33/345 |
| 4,669,195 A * | 6/1987 | Griffin | 33/391 |
| 4,700,479 A * | 10/1987 | Saito et al. | 33/402 |
| 4,811,492 A * | 3/1989 | Kakuta et al. | 33/391 |
| 4,843,725 A * | 7/1989 | Harris | 33/391 |
| 4,923,015 A | 5/1990 | Barsby et al. | |

(Continued)

FOREIGN PATENT DOCUMENTS

JP 61148320 7/1986

(Continued)

OTHER PUBLICATIONS

Pages from www.magnetsource.com, no date.

*Primary Examiner*—G. Bradley Bennett
(74) *Attorney, Agent, or Firm*—Coats & Bennett, PLLC

(57) ABSTRACT

A magnetically damped fork level indicating device comprises a housing having a gauge section; an elongate indicator arm pivotally coupled to the housing, the arm having first and second sections disposed on opposite sides of the axis; a weight coupled to the indicator arm so as to cause the first section to assume a predetermined orientation with respect to level ground; wherein the indicator arm at least partially overlies the gauge section and wherein the relative position of the indicator arm and the gauge section indicate the relative angular relationship between the orientation of the forks and level ground; a dampening means comprising a first magnet associated with the arm and moveable therewith and a second magnet associated with the housing and spaced from the first magnet, the second magnet magnetically coupled to the first magnet so as to dampen oscillations of the arm.

20 Claims, 6 Drawing Sheets

U.S. PATENT DOCUMENTS

| | | | |
|---|---|---|---|
| 5,038,489 A * | 8/1991 | Muehlenbein | 33/391 |
| 5,174,035 A | 12/1992 | Yamazaki | |
| 5,459,676 A | 10/1995 | Livingston | |
| 5,697,755 A | 12/1997 | McCauley et al. | |
| 6,293,022 B1 | 9/2001 | Chino et al. | |
| 6,298,009 B1 | 10/2001 | Stringer | |
| 6,351,890 B1 * | 3/2002 | Williams | 33/391 |
| 6,470,580 B1 * | 10/2002 | Ushihara et al. | 33/391 |
| 6,543,147 B2 * | 4/2003 | Akieda | 33/391 |
| 2003/0024132 A1 | 2/2003 | Kokura et al. | |

FOREIGN PATENT DOCUMENTS

| | | |
|---|---|---|
| JP | 1282415 | 11/1989 |

* cited by examiner

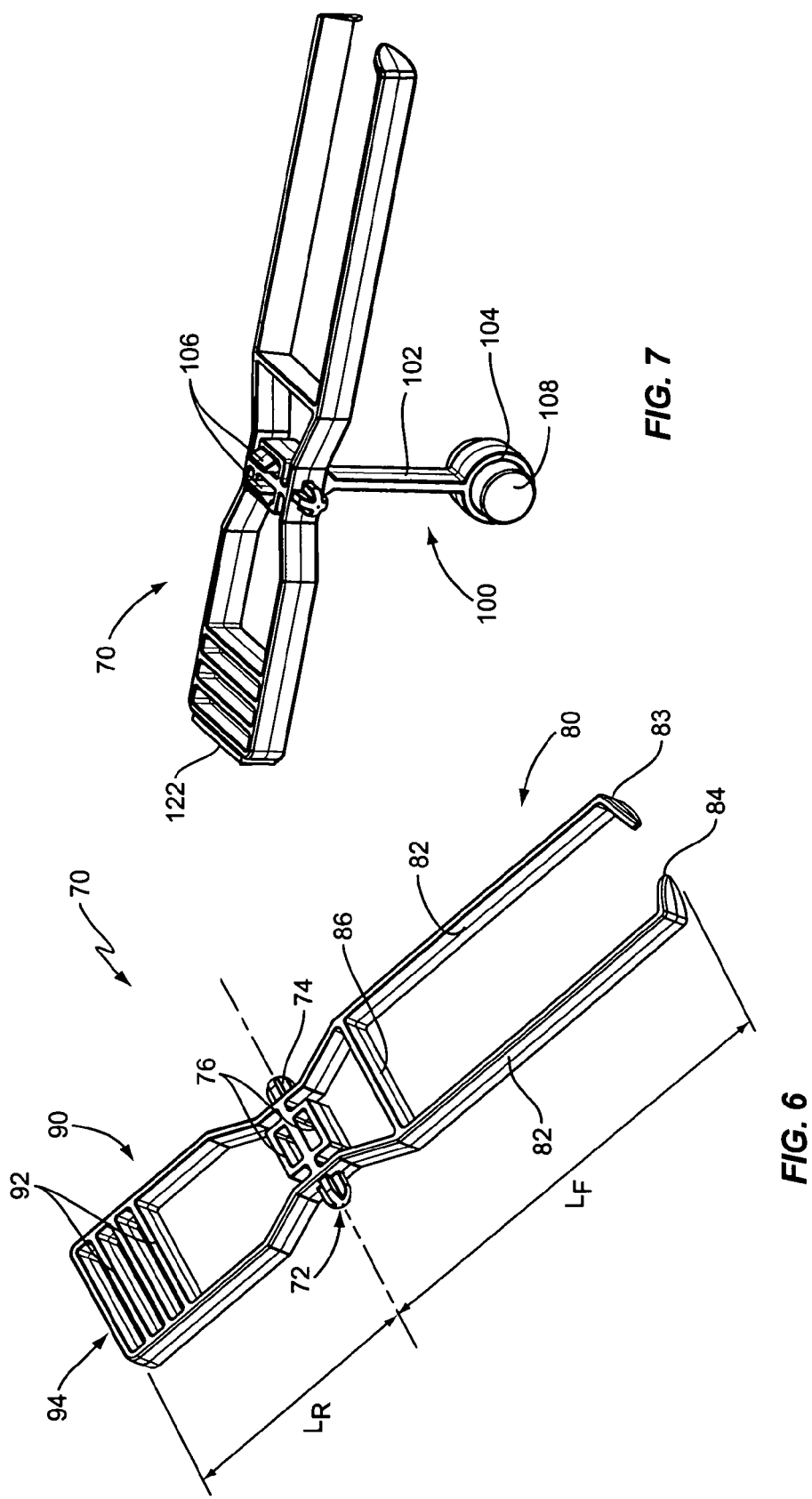

FORK LEVEL INDICATOR WITH MAGNETIC DAMPENING MEANS

BACKGROUND OF THE INVENTION

The present invention relates generally to the field of safety devices for forklifts, and more particularly to an easy to view indicator that shows the relative angle between the forks of the forklift and level ground.

Many times when operating a forklift (or "towmotor") it is desirable to have the forks level, that is oriented so as to be parallel to level ground. Often times, the forklift operator relies on direct physical observation of the forks to determine if the forks are level. However, it is not uncommon for the operator's view of the forks to be obscured by the forklift's mast, intervening cables, the cargo to be lifted, or other items. Further, when the mast is extended such that the forks are located significantly above the operator, or the forks are placed very close together, or the forklift is on a slope, the resulting perspective view often makes it very difficult for the operator to properly judge the angle of the forks. And, if the operator is forced to exit the forklift so as to view the forks from the side, assuming such is possible, this process is plainly inefficient.

A number of approaches have been proposed for providing the forklift operator with a better indication of the levelness of the forks. For instance, a complex mechanical linkage is proposed in U.S. Pat. No. 5,697,755 to McCauley et al. The McCauley approach is somewhat of an improvement, but McCauley's mechanical linkage system is both complex and difficult to see from the typical operating position. Another approach is proposed by U.S. Pat. No. 5,131,801 to Melanson, wherein a tilt sensor and display panel are used. However, the Melanson approach requires a power source, is costly, and adds a further cable to the forklift. Still other approaches are shown in U.S. Pat. No. 3,883,021 to Wilhelm and U.S. Pat. No. 3,049,257 to Bertenshaw. None of these prior approaches have proven entirely satisfactory.

Accordingly, there remains a need for alternative designs of fork level indicating devices, preferably ones that do not rely on electrical power or complex mechanical linkages.

SUMMARY OF THE INVENTION

The present invention provides a method of, and apparatus for, monitoring the relative angle between the forks of a forklift and level ground that does not rely on electrical power or complex mechanical linkages. A magnetically damped fork level indicating device for use with a forklift having a moveable mast with forks connected thereto to move therewith comprises a housing having a gauge section; an elongate indicator arm pivotally coupled to the housing for rotation about an axis generally perpendicular to the mast, wherein the indicator arm has a first section and a second section disposed on opposite sides of the axis; a weight coupled to the indicator arm so as to cause the first section to assume a predetermined orientation with respect to level ground; wherein the indicator arm at least partially overlies the gauge section and wherein the relative position of the indicator arm and the gauge section indicate the relative angular relationship between the orientation of the forks and level ground; a dampening means for dampening oscillations of the indicator arm, the dampening means comprising a first magnet associated with the indicator arm and moveable therewith and a second magnet associated with the housing and spaced from the first magnet, the second magnet magnetically coupled to the first magnet so as to dampen oscillations of the indicator arm. The predetermined orientation with respect to level ground may be generally parallel to level ground. The frame may releaseably mount to the mast. The second magnet may comprise a magnetic strip, such as one attached to a rib disposed in the housing, where the rib may be convexly curved relative to the axis. The first and second sections of the indicator arm may be of different lengths and first and second sections may be configured to counterbalance each other about the axis. The second magnet may advantageously remain spaced from the first magnet by at least a minimum distance throughout the rotation of the indicator arm through an arc of at least ±15°, advantageously approximately ±30°, about a neutral position, wherein the neutral position corresponds to the forks being substantially parallel with level ground. The weight may couple to the indicator arm via a snap-fit connection.

BRIEF DESCRIPTION OF THE DRAWINGS

FIG. 6 shows a perspective view of an indicator arm.

FIG. 7 shows a weight assembly joined to an indicator arm.

DETAILED DESCRIPTION OF ONE OR MORE EMBODIMENTS OF THE INVENTION

Figure 1:
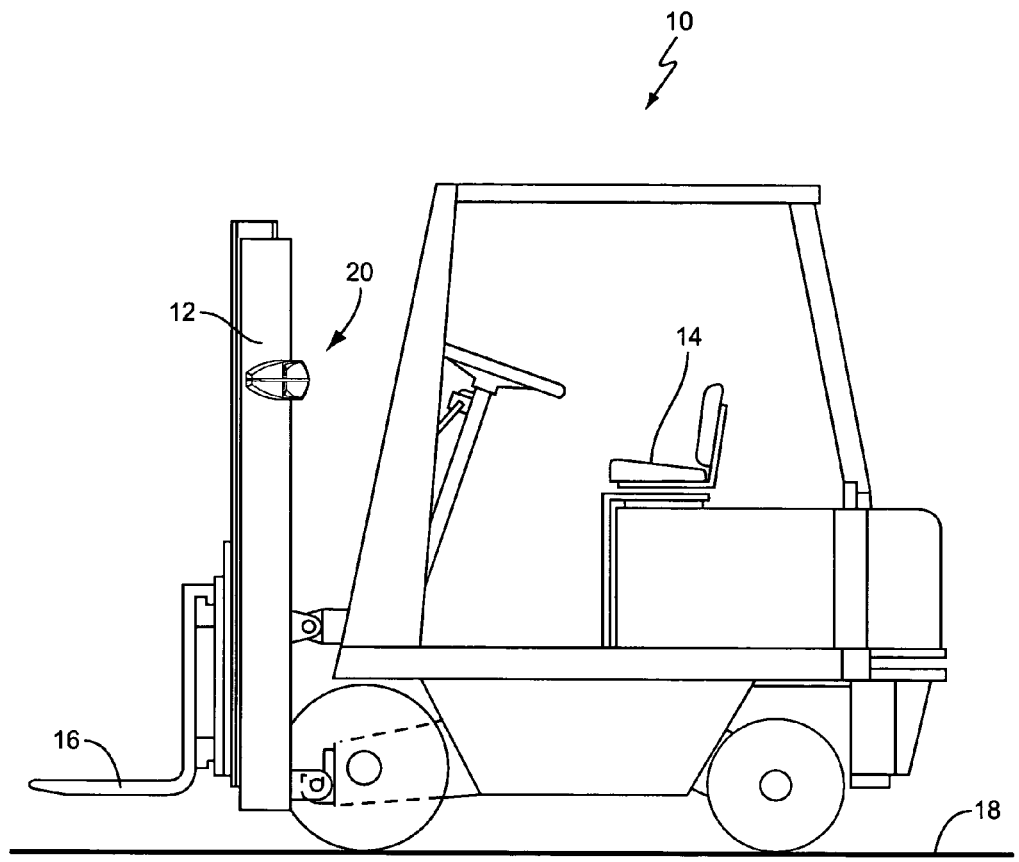
FIG. 1 shows one embodiment of the device of the present invention attached to a typical forklift.
Figure 2A:
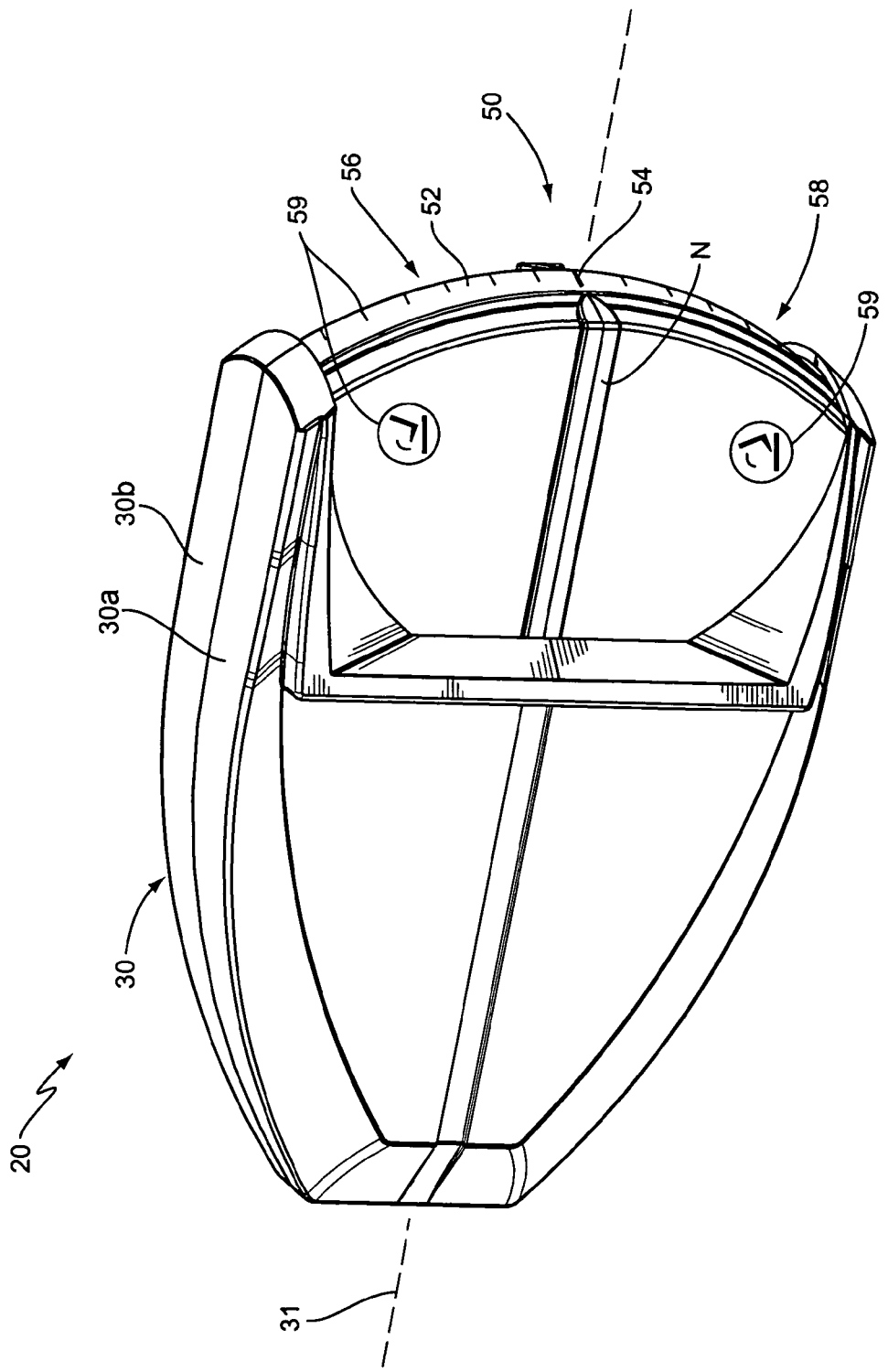
FIG. 2A shows a perspective view of a device according to one embodiment of the present invention.
Figure 2B:
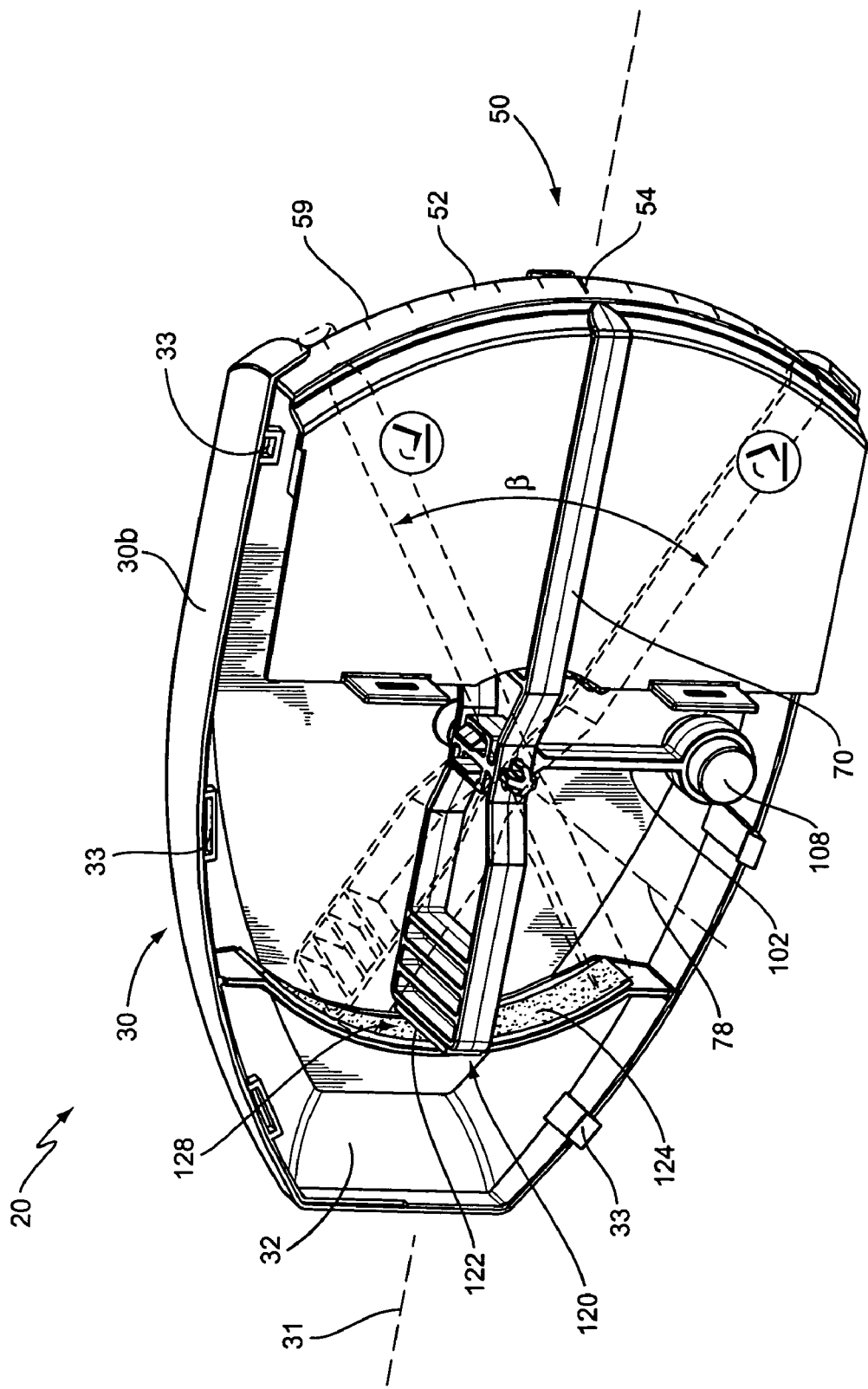
FIG. 2B shows a the device of FIG. 2A with a portion of the housing removed.
Figure 3B:
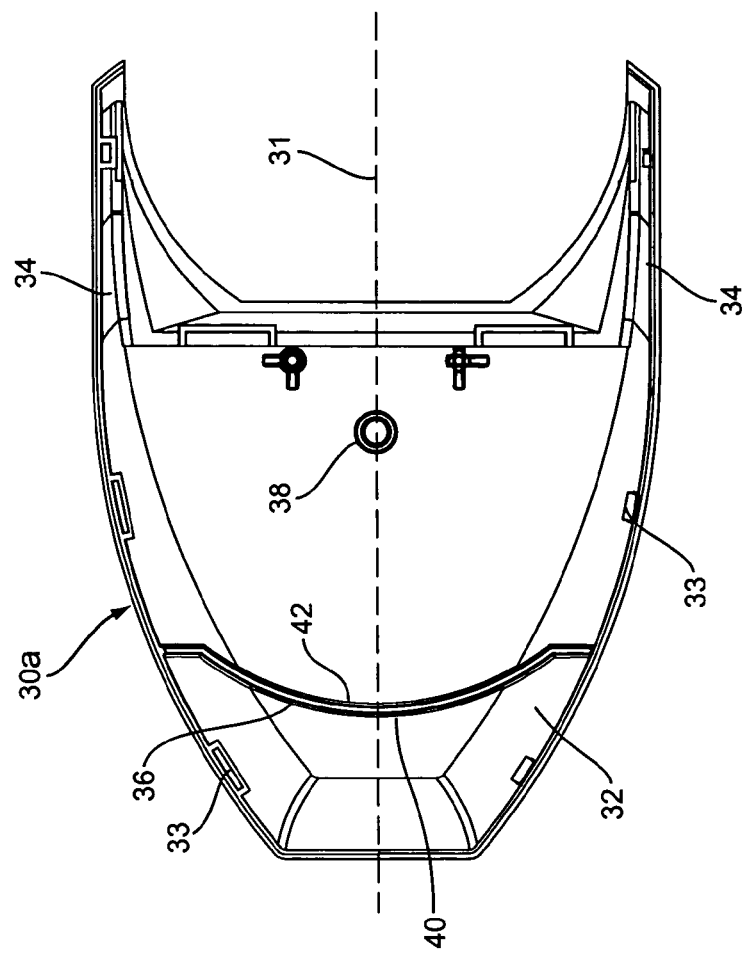
FIGS. 3A & 3B show a perspective and interior view of a shell.
Figure 3A:
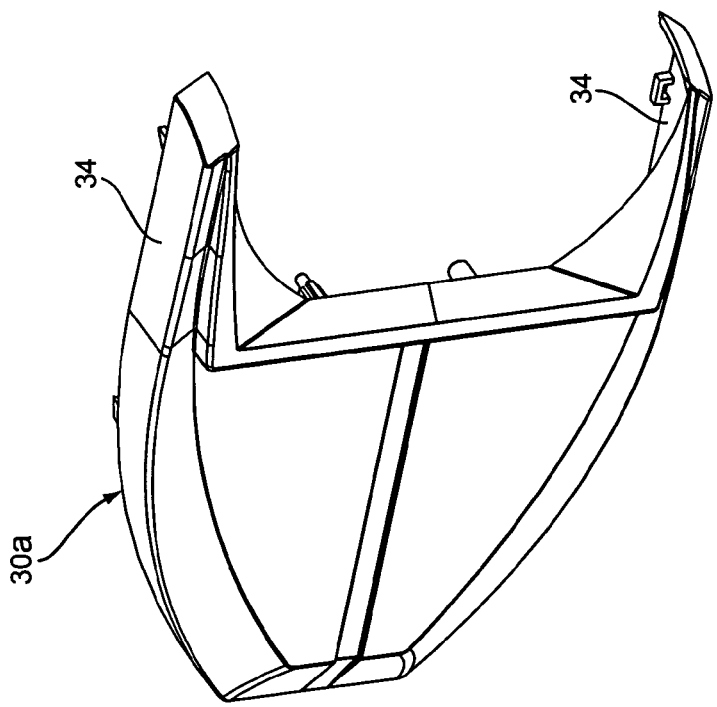

In one embodiment, the present invention is a device that indicates the relative angle between the forks 16 of a forklift 10 and level ground 18. A typical forklift 10 (or "towmotor") is shown in FIG. 1. The forklift 10 includes a seat 14 at the normal operator position that faces forward toward the forks 16. The forks 16 connect to the main body of the forklift 10 via a moveable, and typically telescoping, mast 12. The forks 16 are designed to extend in a direction that is a fixed angle with respect to the mast 12, typically 90°. Thus, by tilting the mast 12 forward and backward, the forks 16 can be made to tilt forward or backward. Unfortunately, the operator's view of the forks 16 is somewhat obscured due to the intervening mast 12, cables, and the like. The fork level indicating device of the present invention, generally indicated at 20, is attached to the mast 12 in a location easily viewable by the operator, such as that shown in FIG. 1, and thereby provides a readily viewable indication of the relative angle between the forks 16 and level ground 18.

One embodiment of the fork level indicating device 20 includes a housing 30 with an indicator arm 70 pivotally attached thereto for rotation about axis 78. As generally seen in the Figures, the housing 30 may comprise two shell portions 30a,30b that mate together, with a gauge section 50 mounted in a forward portion thereof, and a cover 60. Shell 30a includes a peripheral wall 32 that generally defines a hollow interior section. The peripheral wall 32 includes suitable interlocking means 33, such as integral spring latch fingers and corresponding catches, for suitably aligning and mating the respective shells 30a,30b together. The forward portion of the shell 30*a* includes forwardly projecting arm sections 34. In addition, the shell 30*a* includes a mounting boss 38 for mounting the indicator arm assembly that is advantageously located approximately equidistant from the tips of the forwardly projecting arm sections 34 and is centered about axis 78. The shell 30*a* further includes a reinforcing rib 36 that includes an arcuate section 40 with a face 42 thereof oriented toward axis 78. The arcuate section 40 advantageously has a constant radius of curvature centered about a point that is offset rearwardly from axis 78 by the thickness of magnet 124, discussed below. The shell 30*a* may advantageously be symmetric about a central line 31, thereby allowing shells 30*a*,30*b* to be identical.

Figure 4:
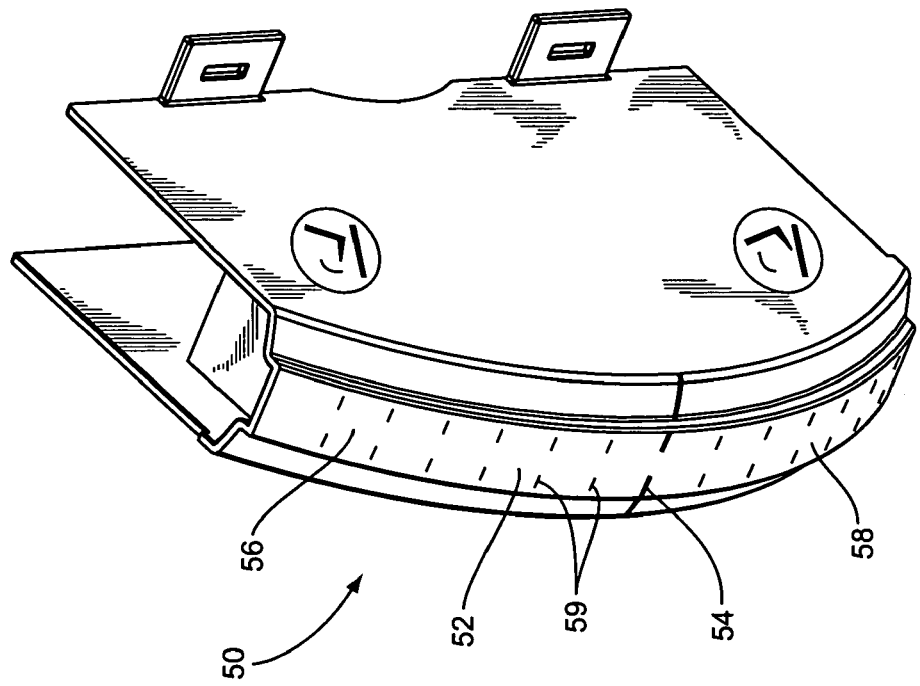
FIG. 4 shows a perspective view of a gauge section.

The gauge section 50 may take the form shown in FIG. 4. The gauge section 50 mounts to the shell portions 30*a*,30*b* and is held in place when the shell portions 30*a*,30*b* are joined together. The gauge section 50 provides a background 52 for the indicator arm 70 and advantageously includes sections 54,56,58 corresponding respectively to a neutral mark, an angled upward orientation, and an angled downward orientation. The gauge section 50 may advantageously include suitable angular displacement indicia 59, such as at 5° increments, along its forward face. The sides of the gauge section 50 may also include other graphical indicia 59, such as to indicate the direction of tilt. The visible portions of the gauge section 50 may be color coded as appropriate.

Figure 5:
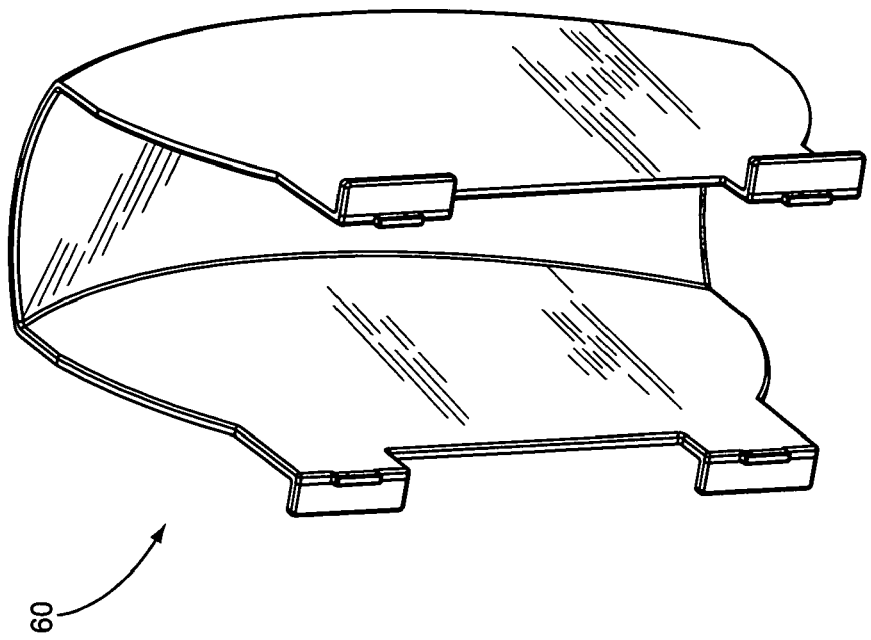
FIG. 5 shows a perspective view of a cover.

While the gauge section 50 may be exposed, it is believed to be advantageous if the gauge section 50 is protected by cover 60. One possible embodiment of the cover 60, which is advantageously transparent, is shown in FIG. 5. Preferably, the cover 60 is spaced from the front face and sides of the gauge section 50 so as to provide a protected area for the movement of the indicator portion of the indicator arm 70. The cover 60 may or may not have optical enhancing properties (e.g., magnification), as is desired. The cover 60 may nest with the gauge section 50, and respective ear-flanges may be used to inter-engage the same with the shells 30*a*,30*b*. Advantageously, the cover 60 and the gauge section 50 are firmly captured in place when the shells 30*a*,30*b* are joined together, such as by snap-fitting without screws or adhesives, although the later may also be employed if desired.

The indicator arm 70 is pivotally coupled to the housing 30 for rotation about axis 78 at a mounting area 72. The mounting area 72 includes a pair of laterally extending axle bosses 74 that are designed to rotatably engage the corresponding mounts 38 on the shells 30*a*,30*b* for support thereby. The mounting area 72 may further include a portion of a connection means for attaching the weight assembly 100, such as box type flanges 76. The indicator arm 70 is generally elongate with front and rear portions 80,90. The front portion 80 includes two spaced apart fingers 82 that each include a bend 83 and a tip 84 disposed distally from the mounting area 72. The bend 83 and tip 84 are arranged so that the tip 84 overlies a portion of the gauge section 50, for "foreground" movement relative thereto. The more centrally located portions of the fingers 82 may include a stiffening spar 86 if desired. The rear portion 90 may take the form of a somewhat rectangular frame with a rear face 94 that is disposed roughly tangential to axis 78. This rear face 94 may be straight or convexly curved away from axis 78. The length $L_F$ front portion 80 is advantageously longer than the length $L_R$ of the rear portion 90 by at least 50%. However, it is also advantageous if the front portion 80 and the rear portion 90 counterbalance each other with respect to axis 78. As such, the rear portion 90 may further include one or more spars 92 for added weight. Advantageously, the indicator arm 70 moves across an arc of movement that is centered about a neutral position where the tip 84 overlies the neutral mark 54 on the gauge section and corresponds to the forks 16 being parallel to level ground 18. The angle β swept by the indicator arm 70 may be ±15° or more, advantageously approximately ±30°.

A weight assembly 100 is attached to the indicator arm 70 and rotates therewith. The weight assembly 100 includes a weight support 102 and at least one weight 108. The weight support 102 includes appropriate means to interlock with the indicator arm 70, such as spring fingers 106 that engage the flanges 76 on the indicator arm 70. The weight support 102 may include a hole 104 for accepting a suitable weight 108, such as a cylindrical steel weight. Of course, other means of coupling the weight 108 to the indicator arm 70 may be used, such as integrally forming the weight 108 as a portion of the indicator arm 70, adhering the weight 108 to the indicator arm 70, screws, or any other means known in the art. While the device 20 is illustrated with one weight 108, it should be understood that the weight assembly 100 may have multiple weights 108 if desired.

It is anticipated that the forklift 10 will be subjected to jolts and the like when moving. Such jolts have a tendency to cause the indicator arm 70 to bounce up and down and then oscillate, taking extra time to settle and give accurate readings, which is undesirable. As such, the present device includes a dampening means 120 for dampening oscillations of the indicator arm 70. The dampening means 120 includes two magnets 122,124 that are spaced from one another, one associated with the indicator arm 70 and the other associated with the housing 30. Magnet 122 is positioned on the rear face 94 of the indicator arm 70. Magnet 124 is positioned on arc section 40 of housing 30. Magnet 124 may be formed of two parts, one on shell 30*a* and the other on shell 30*b*. Both magnets 122,124 may advantageously take the form of strip magnets with adhesive backing. The adhesive backing may be used to mount the magnets 122,124 in the desired locations. The two magnets 122,124 are spaced from one another by gap 128. While not required in all embodiments, this gap 128 is advantageously constant for the full rotational movement of the indicator arm 70 across angle β. It should be noted that the dampening means 120 may include other elements, such as a dampening spring (not shown), but such additional elements are not believed necessary, and add cost.

In use, the fork level indicating device 20 is attached to a non-telescoping outer portion of the mast 12 such that the side of the housing 30 is along the side of the mast 12 and the gauge section faces generally toward the operator position 14. Advantageously, a carpenter's level or the like is used during the mounting device 20 so that the conceptual line running from the axis 78 to mark 54 is parallel to level ground 18. Screws, welding, adhesives, double-sided tape, interlocking mechanical means 34, or other means may be used to facilitate mounting of the device to the mast 12. The non-telescoping portion of the mast 12 is used for mounting in order to allow the device 20 to stay in a known visual position so that the operator can easily refer to the device 20 with minimal effort, even when the mast 12 is extended.

With the fork level indicating device 20 mounted to the mast 12, axis 78 is oriented horizontally, i.e., parallel to level ground 18. When the mast 12 is straight up, i.e., perpendicular to level ground 18, the balanced nature of the indicator arm 70 causes the tip 84 to overlie the neutral mark 54 on the gauge section 50. When the mast 12 is tilted forward from this position, the counter-balancing of indicator arm 70 and the weight 108 cause the indicator arm 70 to stay level with respect to level ground 18. As such, the indicator arm 70 rotates relative to the housing 30 such that the tip 84 moves to overlie the area 58 on gauge section 50 corresponding to downwardly angled forks 16. Also, the greater the tilt of the mast 12, the greater the displacement of the tip 84. Likewise, when the mast 12 is tilted backward from the neutral position 54, the counter-balancing of the indicator arm 70 and the weight 108 cause the indicator arm 70 to rotate the opposite direction relative to the housing 30 such that the tip 84 moves to overlie the area 56 on gauge section 50 corresponding to upwardly angled forks 16. Thus, the movement of the indicator arm 70 mimics the movement of the forks 16 relative to level ground 18. Also, it should be noted that the indicator arm 70 moves relative to the housing 30 due to the action of gravity, without electrical or mechanical linkage input. In this fashion, the indicator arm 70 and the housing 30 cooperate to form a levelness gauge for indicating the relative angle between the forks 16 and level ground 18.

As pointed out above, the dampening means 120 helps to dampen the oscillations of the indicator arm 70 when the device 10 is jolted. The magnets 122,124 are magnetically coupled, meaning that the respective magnetic fields interact with each other to a significant degree. This magnetic coupling acts as a non-contact damper to dampen the oscillations of the combined indicator arm 70 and weight assembly 100. Thus, the inertia of the combined indicator arm 70 and weight assembly 100 when moving rotating back and forth about axis 78 is dissipated by the dampening means 120. However, the dampening action of the dampening means 120 is not so strong so as to prevent the action of gravity on the weight assembly 100 from causing the indicator arm 70 to assume the desired predetermined position with respect to level ground (typically parallel thereto).

With the gauge section 50 of the housing 30 facing the operator, and readily viewable thereby, the operator can easily monitor the "levelness" of the forks 16 by looking at the position of the tip 84 and/or the distal portion of the indicator arm 70. Thus, a mechanically simple device 20 is provided that is readily viewable by the forklift operator (or load spotter) and allows for easy monitoring of the levelness of the forks 16 from a wide viewing angle.

The entire device 20 may be made from injection molded plastic, such as ABS, polycarbonate, or the like, except for the weight 108 and the magnets 122,124, which should be made from materials well known in the art. The weight 108 may be approximately fifteen grams, and the gap 128 may be 0.090 inches. The magnets 122,124 may be strip magnets such as those available from www.magnetsource.com under part numbers ZG40AC and ZG10AC.

The device 20 of the present invention may be retro-fitted to existing forklifts 10, or may be made available as original equipment from the forklift manufacturer. In addition, by suitably choosing the markings 59 on the background 52, the device may be made such that the same device 20 could be attached to the outboard side of either the right or left mast 12 (e.g., on the operator's right or left side). For example, in some embodiments of the device 10, the housing 30 may be removed from one mast 12 of the forklift 10 and remounted to the other mast 12 of the same forklift 10 such that the housing 30 is coupled to the new mast 12 on the opposite side face of the housing 30. Thus, by attaching the housing 30 to the mast 12 at a different portion of the housing 30, the relative up/down orientation of the device 10 need not be changed. Further, icons and standard numerals may advantageously be employed to avoid language barriers, thereby improving communication and safety.

The present invention may, of course, be carried out in other specific ways than those herein set forth without departing from the essential characteristics of the invention. The present embodiments are, therefore, to be considered in all respects as illustrative and not restrictive, and all changes coming within the meaning and equivalency range of the appended claims are intended to be embraced therein.

What is claimed is:

1. A magnetically damped fork level indicating device for use with a forklift having a moveable mast with forks connected thereto to move therewith, said forklift having an operator seat location, comprising:
   a housing having a gauge section facing generally toward the operator seat location;
   an elongate indicator arm pivotally coupled to said housing for rotation about an axis generally perpendicular to said mast, wherein said indicator arm has a first section and a second section disposed on opposite sides of said axis;
   a weight coupled to said indicator arm so as to cause said first section to assume a predetermined orientation with respect to level ground under the influence of gravity;
   wherein said indicator arm at least partially overlies said gauge section and wherein the relative position of said indicator arm and said gauge section indicate the relative angular relationship between the orientation of the forks and level ground;
   a dampening means for dampening oscillations of said indicator arm, said dampening means comprising a first magnet associated with said indicator arm and moveable therewith and a second magnet associated with said housing and spaced from said first magnet, said second magnet magnetically coupled to said first magnet so as to dampen oscillations of said indicator arm.

2. The device of claim 1 wherein said predetermined orientation with respect to level ground is generally parallel to level ground.

3. The device of claim 1 wherein said frame releaseably mounts to said mast.

4. The device of claim 1 wherein said second magnet comprises a magnetic strip.

5. The device of claim 4 wherein said second magnet comprises a magnetic strip attached to a rib disposed in said housing.

6. The device of claim 5 wherein said rib is convexly curved relative to said axis.

7. The device of claim 1 wherein said first and second sections are configured to counterbalance each other about said axis.

8. The device of claim 1 wherein said second magnet remains spaced from said first magnet by at least a minimum distance throughout the rotation of said indicator arm through an arc of at least ±15° about a neutral position, wherein said neutral position corresponds to the forks being substantially parallel with level ground.

9. The device of claim 1 wherein said first section of said indicator arm comprises a bend distal from said axis and a tip more distal from said axis than said bend; said tip extending substantially parallel to said axis and overlying said cause section.

10. The device of claim 1 wherein said first section overlies an upper portion of said gauge section to indicate the forks are tilted upward with respect to level ground and wherein said first section overlies a lower portion of said gauge section to indicate the forks are tilted downward with respect to level ground.

11. The device of claim 1:

wherein said frame releaseably mounts to said mast;

wherein said second magnet comprises a magnetic strip attached to a rib disposed in said housing, said rib convexly curved relative to said axis;

wherein said first and second sections are of different lengths and configured to counterbalance each other about said axis;

wherein said second magnet remains spaced from said first magnet by at least a minimum distance throughout the rotation of said indicator arm through an arc of at least ±15° about a neutral position, wherein said neutral position corresponds to the forks being substantially parallel with level ground; and wherein said first section overlies an upper portion of said gauge section to indicate the forks are tilted upward with respect to level ground and wherein said first section overlies a lower portion of said gauge section to indicate the forks are tilted downward with respect to level ground.

12. The device of claim 11 wherein said weight couples to said indicator arm via a snap-fit connection.

13. A magnetically damped fork level indicating device for use with a forklift having a moveable mast with forks connected thereto to move therewith, comprising:

a housing having a gauge section;

an elongate indicator arm pivotally coupled to said housing for rotation about an axis generally perpendicular to said mast, wherein said indicator arm has a first section and a second section disposed on opposite sides of said axis;

a weight coupled to said indicator arm so as to cause said first section to assume a predetermined orientation with respect to level around under the influence of gravity;

wherein said indicator arm at least partially overlies said gauge section and wherein the relative position of said indicator arm and said gauge section indicate the relative angular relationship between the orientation of the forks and level ground;

a dampening means for dampening oscillations of said indicator arm, said dampening means comprising a first magnet associated with said indicator arm and moveable therewith and a second magnet associated with said housing and spaced from said first magnet, said second magnet magnetically coupled to said first magnet so as to dampen oscillations of said indicator arm;

wherein said first and second sections are of different lengths.

14. The device of claim 13 wherein said first and second sections are configured to counterbalance each other about said axis.

15. A method of indicating the relative angle between the forks of a forklift and level ground, comprising:

mounting a housing to a mast of the forklift so that a gauge section of said housing faces generally toward an operator seat location of the forklift, said housing having an indicator arm rotatably coupled thereto for rotation about an axis, said indicator arm having a weight coupled thereto so as to cause a first section of said indicator arm to assume a predetermined orientation with respect to level ground under the influence of gravity;

damping oscillations of said arm relative to said housing via the magnetic interaction of a first magnet associated with said arm and a second magnet associated with said housing, said magnets separated by a gap.

16. The method of claim 15 wherein at least one of said first and second magnets are strip magnets.

17. The method of claim 15 wherein said indicator arm has first and second sections disposed on opposite sides of said axis, wherein said first and second sections are of different lengths and configured to counterbalance each other about said axis.

18. The method of claim 15 wherein said second magnet remains spaced from said first magnet by at least a minimum distance throughout the rotation of said indicator arm through an arc of at least ±15° about a neutral position, wherein said neutral position corresponds to the forks being substantially parallel with level ground.

19. The method of claim 15 further comprising indicating that the forks are tilted upward with respect to level ground by having said first section overlies an upper portion of a gauge section and indicating that the forks are tilted downward with respect to level ground by having said first section overlies a lower portion of said gauge section.

20. The method of claim 15 further comprising removing said housing from said mast and remounting said housing to another mast of the same forklift such that said housing is coupled to the new mast at a different portion of the housing.

* * * * *